US009042376B2

(12) United States Patent
Hwang et al.

(10) Patent No.: US 9,042,376 B2
(45) Date of Patent: May 26, 2015

(54) TRAVERSAL METHOD FOR ICMP-SENSITIVE NAT

(71) Applicant: National Taipei University of Technology, Taipei (TW)

(72) Inventors: Shaw Hwa Hwang, Taipei (TW); Bing Chih Yao, Taipei (TW); Chao Ping Chu, Taipei (TW); Ning Yun Ku, Taipei (TW); Tzu Hung Lin, Taipei (TW); Ming Che Yeh, Taipei (TW)

(73) Assignee: NATIONAL TAIPEI UNIVERSITY OF TECHNOLOGY, Taipei (TW)

( * ) Notice: Subject to any disclaimer, the term of this patent is extended or adjusted under 35 U.S.C. 154(b) by 105 days.

(21) Appl. No.: 13/778,203

(22) Filed: Feb. 27, 2013

(65) Prior Publication Data
US 2014/0241339 A1 Aug. 28, 2014

(51) Int. Cl.
*H04L 29/12* (2006.01)
*H04W 4/00* (2009.01)
*H04L 12/56* (2006.01)
*H04L 12/66* (2006.01)
*H04L 29/06* (2006.01)

(52) U.S. Cl.
CPC ......... *H04L 61/2564* (2013.01); *H04L 61/1529* (2013.01); *H04L 61/2589* (2013.01); *H04L 65/1006* (2013.01)

(58) Field of Classification Search
CPC ......... H04L 12/56; H04L 12/66; H04L 43/08; H04L 61/2564
USPC ............................ 370/352, 401, 390, 230, 252
See application file for complete search history.

(56) References Cited

U.S. PATENT DOCUMENTS

| 8,059,641 | B1 | 11/2011 | Rai | |
|---|---|---|---|---|
| 8,370,497 | B2* | 2/2013 | Quittek et al. | 709/227 |
| 2008/0013524 | A1* | 1/2008 | Hwang et al. | 370/352 |
| 2010/0182995 | A1* | 7/2010 | Hwang et al. | 370/352 |

OTHER PUBLICATIONS

J. Rosenberg (Cisco), R. Mahy, P. Matthews and D. Wing (Cisco), Session Traversal Utilities for NAT (STUN), Internet Engineering Task Force (IETF): Network Working Group, Request for Comments (RFC): 5389, Oct. 2008.*
R. Mahy, P. Matthews, J. Rosenberg, Traversal Using Relays around NAT (TURN): Relay Extensions to Session Traversal Utilities for NAT (STUN), Internet Engineering Task Force (IETF), Request for Comments (RFC): 5766, Apr. 2010.*

(Continued)

*Primary Examiner* — Chi H Pham
*Assistant Examiner* — Shailendra Kumar
(74) *Attorney, Agent, or Firm* — Bacon & Thomas, PLLC

(57) ABSTRACT

In SIP network environment, a general NAT traversal method will become invalid when an NAT with ICMP (Internet Control Message Protocol) is met. The present invention provides four sessions for SIP, i.e. Login Session, Port Prediction Session, Synchronization Session and Media Session, and the SIP network environment includes a first Internet telephone, a second Internet telephone, a first symmetric NAT, a second symmetric NAT and an SIP proxy server. The first symmetric NAT and the second symmetric NAT are ICMP-sensitive. In the Synchronization Session, the first Internet telephone and the second Internet telephone are designed to transmit packets synchronously to avoid port locking.

1 Claim, 5 Drawing Sheets

(56) References Cited

OTHER PUBLICATIONS

J. Rosenberg, Interactive Connectivity Establishment (ICE): A Protocol for Network Address Translator (NAT) Traversal for Offer/Answer Protocols, Internet Engineering Task Force (IETF), Request for Comments (RFC): 5245, Apr. 2010.*

Pelagie Houngue, Ernesto Damiani, Roch Glitho, Overcoming NAT traversal issue for SIP-based communication in P2P networks, presented at IFIP WMNC'2011, IEEE 978-1-4577-1193-0/11.*

Yong Wang, Zhao Lu, Junzhong Gu, Research on Symmetric NAT Traversal in P2P applications, Proceedings of the International Multi-Conference on Computing in the Global Information Technology (ICCGI 2006), IEEE 0-7695-2629-2/06.*

C. Boulton (NS-Technologies), J. Rosenberg (Skype), G. Camarillo (Ericsson), F. Audet (Skype), NAT Traversal Practices for Client-Server SIP, Internet Engineering Task Force (IETF), Request for Comments (RFC): 6314, Jul. 2011.*

* cited by examiner

TRAVERSAL METHOD FOR ICMP-SENSITIVE NAT

FIELD OF THE INVENTION

The present invention relates to an NAT (Network Address Translator) traversal method, and more particularly to a traversal method for ICMP-sensitive NAT, in which a synchronous technique is used for achieving traversal.

BACKGROUND OF THE INVENTION

In current SIP (Session Initiation Protocol) Internet environment, setting up NAT (Network Address Translator) server is very popular. But the Internet telephones under the NAT server cannot achieve P2P (Peer to Peer) transmission directly for speech packets, an SIP proxy server is needed to assist transmission.

In order to transmit speech packets directly, the Internet telephones have to traverse the NAT server. Related inventions for traversal the NAT server are many, for example, Taiwan Invention Patent I 376133 (related US application is U.S. Ser. No. 12/382,261) provides a plurality of registration before issuing an Invite message during registration session in SIP in order to detect the regular rule of the NAT server for allocating communication port, so that the following speech packets can utilize the regular rule to predict the allocated communication port for P2P transmission directly without passing through the SIP proxy server.

But the above-described traversal method will become invalid when an NAT server with ICMP (Internet Control Message Protocol) is met, it is described as below.

Referring to FIG. 1, in which a schematic diagram for direct speech packets transmission in SIP Internet environment is shown. An Internet telephone 1 and an Internet telephone 2 are under a symmetric NAT 3 and a symmetric NAT 4 respectively. A speech packet comprises four parameters, i.e. source IP address, source communication port number, destination IP address, and destination communication port number. The Internet telephone 1 transmits a speech packet-1 to the Internet telephone 2, the speech packet-1 will become speech packet-1' when passing through the symmetric NAT 3, and the source IP address VIP1 in the speech packet-1 will be converted into RIP1, the source communication port number SP1 will be converted into SP1', while the destination IP address RIP2 and the destination communication port number DP1 remain unchanged. Similarly, The Internet telephone 2 transmits a speech packet-2 to the Internet telephone 1, the speech packet-2 will become speech packet-2' when passing through the symmetric NAT 4, and the source IP address VIP2 in the speech packet-2 will be converted into RIP2, the source communication port number SP2 will be converted into SP2', while the destination IP address RIP1 and the destination communication port number DP2 remain unchanged.

The speech packet-1' and the speech packet-2'can be sent to the opposite side smoothly only when SP1'=DP2 and DP1=SP2'. SP1' is designated by the symmetric NAT 3, SP2' is designated by the symmetric NAT 4, and the designation of the communication port is under a regular rule. The Taiwan Invention Patent I 376133 (related US application is U.S. Ser. No. 12/382,261) is to provide a plurality of registration before issuing an Invite message during registration session in SIP in order to detect the regular rule of the NAT server for allocating communication port, so that the following speech packets can utilize the regular rule to predict the allocated communication port for P2P transmission directly without passing through the SIP proxy server. But even though both sides can conduct P2P transmission directly, synchronous transmissions cannot be guaranteed.

If the symmetric NAT 3 and the symmetric NAT 4 are ICMP (Internet Control Message Protocol) sensitive NATs (i.e. preventive for hackers and viruses), when both sides cannot conduct P2P transmission synchronously, then port locking will be formed. Referring to FIG. 2, the speech packet-1 from the Internet telephone 1 is converted into the speech packet-1' through the symmetric NAT 3 and sent to the symmetric NAT 4, at this time if the communication port of the symmetric NAT 4 is not open, the symmetric NAT 4 will generate a preventive action and return an ICMP rejection packet to the symmetric NAT3, therefore the symmetric NAT3 will lock the communication port itself (as shown by (×)), thereafter the Internet telephone 2 sends a speech packet-2 to be converted into the speech packet-2' through the symmetric NAT4 for sending to the symmetric NAT 3, the speech packet-2' will be blocked by the symmetric NAT 3. This is so-called "outbound".

Another situation is shown in FIG. 3, the speech packet-1 from the Internet telephone 1 is converted into the speech packet-1' through the symmetric NAT 3 and sent to the symmetric NAT 4, at this time if the communication port of the symmetric NAT 4 is not open, the symmetric NAT 4 will generate a preventive action and return an ICMP rejection packet to the symmetric NAT3, the symmetric NAT4 will lock the communication port itself (as shown by (×)), thereafter the Internet telephone 2 sends a speech packet-2 to the symmetric NAT4 for sending to the symmetric NAT 3, but the speech packet-2 will be blocked by the symmetric NAT 4. This is so-called "inbound".

SUMMARY OF THE INVENTION

In order to solve the port locking problem for ICMP-sensitive NAT, the present invention provides a synchronous session in SIP for traversal.

The present invention sets up a registration session, a communication port prediction session, a synchronous session and a media session for SIP, and the Internet environment for SIP comprises a first Internet telephone, a second Internet telephone, a first symmetric NAT, a second symmetric NAT, and an SIP proxy server; the first Internet telephone is under the first symmetric NAT, the second Internet telephone is under the second symmetric NAT; both the first symmetric NAT and the second symmetric NAT are ICMP-sensitive; a traversal method comprises:

the first Internet telephone and the second Internet telephone register on the SIP proxy server firstly to accomplish the registration session;

the first Internet telephone conducts a plurality of detection procedure to the first symmetric NAT for detecting the regular rule of allocating communication port by the first symmetric NAT; the second Internet telephone conducts a plurality of detection procedure to the second symmetric NAT for detecting the regular rule of allocating communication port by the second symmetric NAT; so as to accomplish the communication port prediction session;

thereafter the synchronous session is entered, the first Internet telephone passes a test packet to the SIP proxy server through T1 time, then the SIP proxy server returns the test packet to the first Internet telephone through T2 time; (T1+T2)/2 is therefore the average time T3 that the first Internet telephone sends a packet to the SIP proxy server; then the first Internet telephone sends a packet including T3 information to the SIP proxy server for being kept by the SIP proxy server;

similarly, the second Internet telephone passes a test packet to the SIP proxy server through T4 time, then the SIP proxy server returns the test packet to the second Internet telephone through T5 time; (T4+T5)/2 is therefore the average time T6 that the second Internet telephone sends a packet to the SIP proxy server; then the second Internet telephone sends a packet including T6 information to the SIP proxy server for being kept by the SIP proxy server;

after the SIP proxy server receives the packets including time information from both sides, the SIP proxy server will then exchange the time information to the opposite side simultaneously, the first Internet telephone will receive the packet including T6 information sent from the second Internet telephone; the second Internet telephone will receive the packet including T3 information sent from the first Internet telephone;

if T6>T3, then after the second Internet telephone receives the packet including T3 information, the second Internet telephone enters the media session immediately to send speech packets directly to the first Internet telephone without going through the SIP proxy server; while the first Internet telephone has to wait T6–T3 time after receiving the packet including T6 information, and then enter the media session to send speech packets directly to the second Internet telephone without going through the SIP proxy server; therefore both sides have entered the media session to send speech packets with each other synchronously;

if T3>T6, then after the first Internet telephone receives the packet including T6 information, the first Internet telephone enters the media session immediately to send speech packets directly to the second Internet telephone without going through the SIP proxy server; while the second Internet telephone has to wait T3–T6 time after receiving the packet including T3 information, and then enter the media session to send speech packets directly to the first Internet telephone without going through the SIP proxy server; therefore both sides have entered the media session to send speech packets with each other synchronously.

DETAILED DESCRIPTIONS OF THE PREFERRED EMBODIMENTS

The present invention sets up a registration session, a communication port prediction session, a synchronous session and a media session for SIP.

Figure 1:
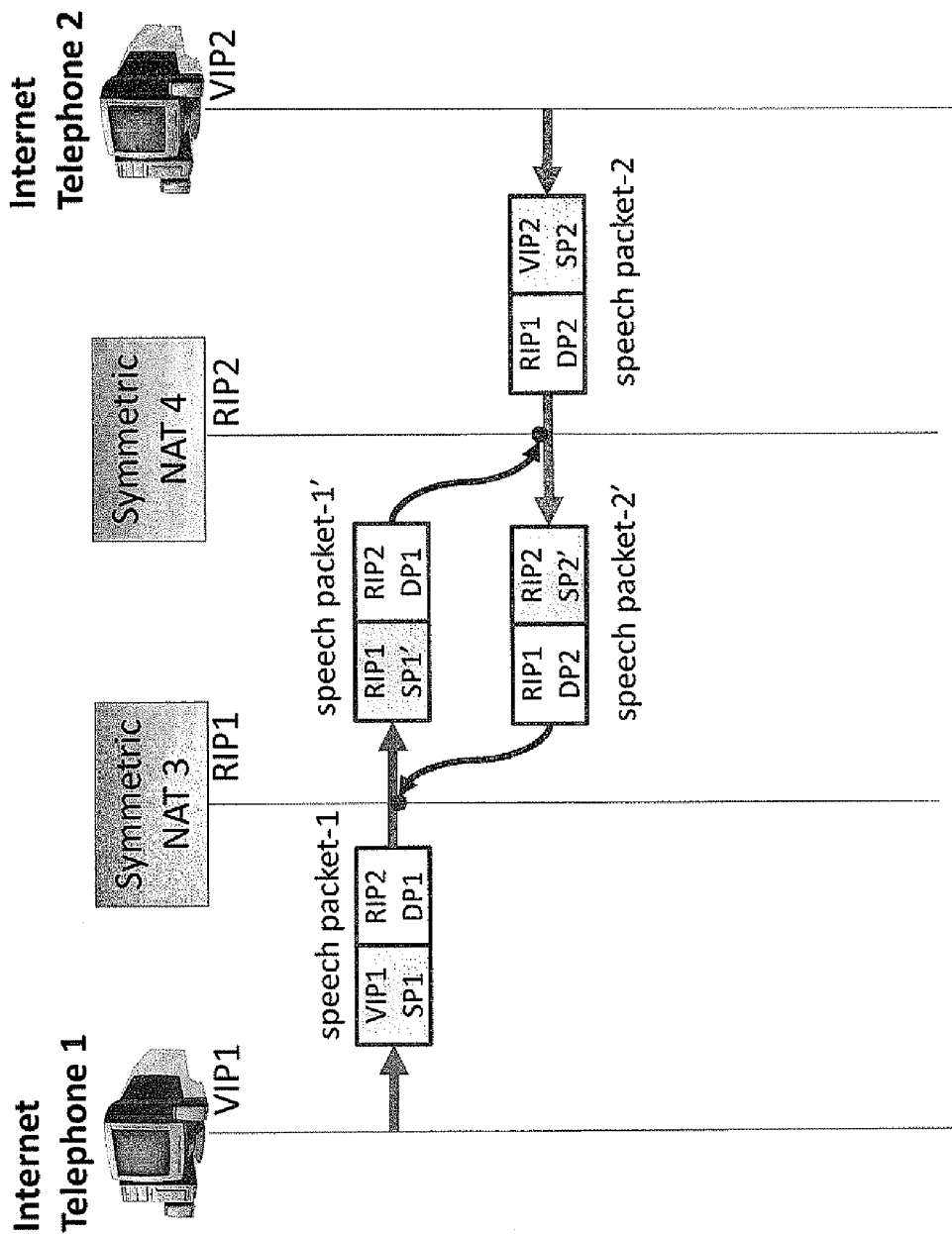
FIG. 1 shows schematically the direct speech packets transmission in SIP Internet environment.
Figure 2:
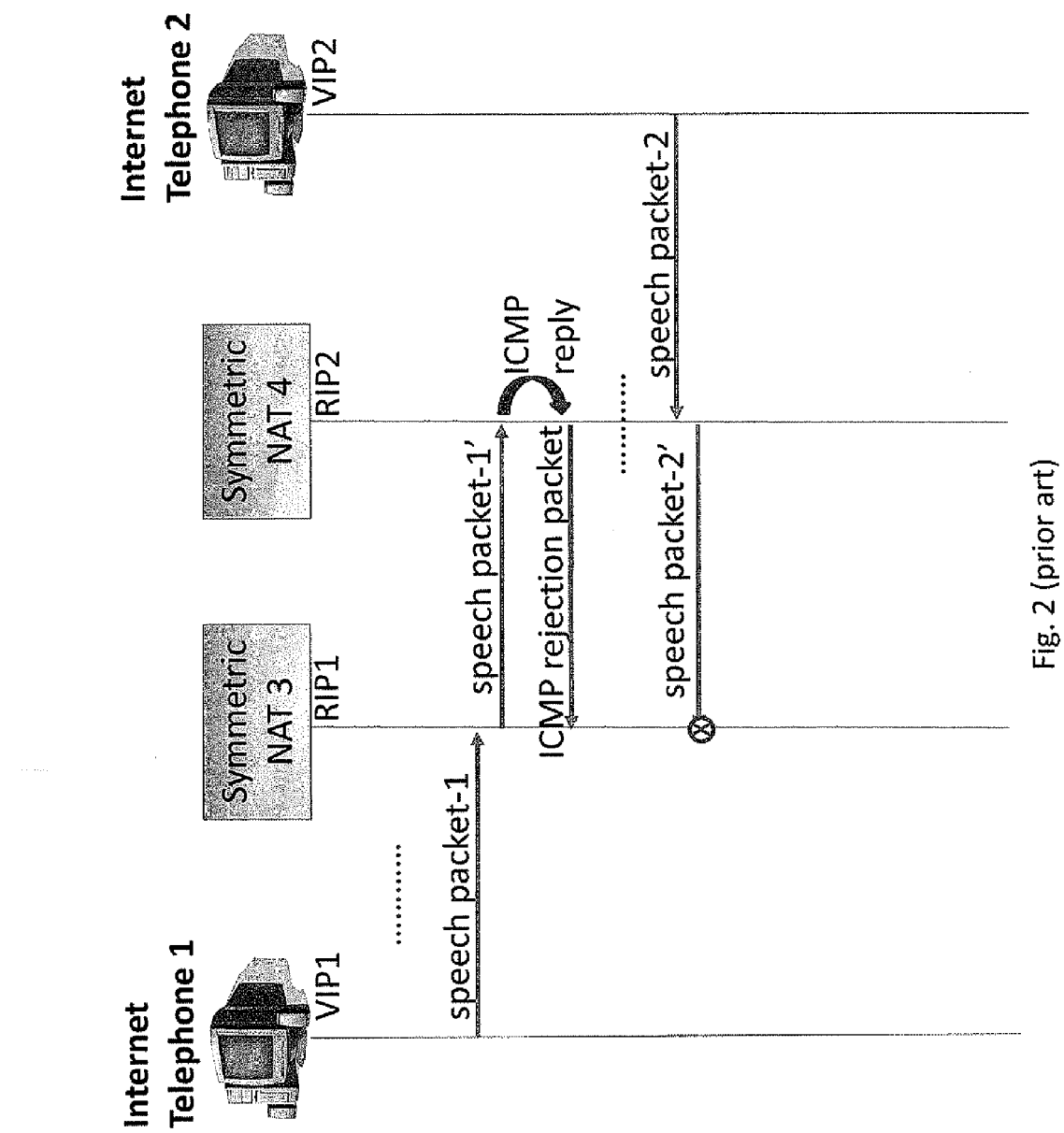
FIG. 2 shows schematically the "outbound".
Figure 3:
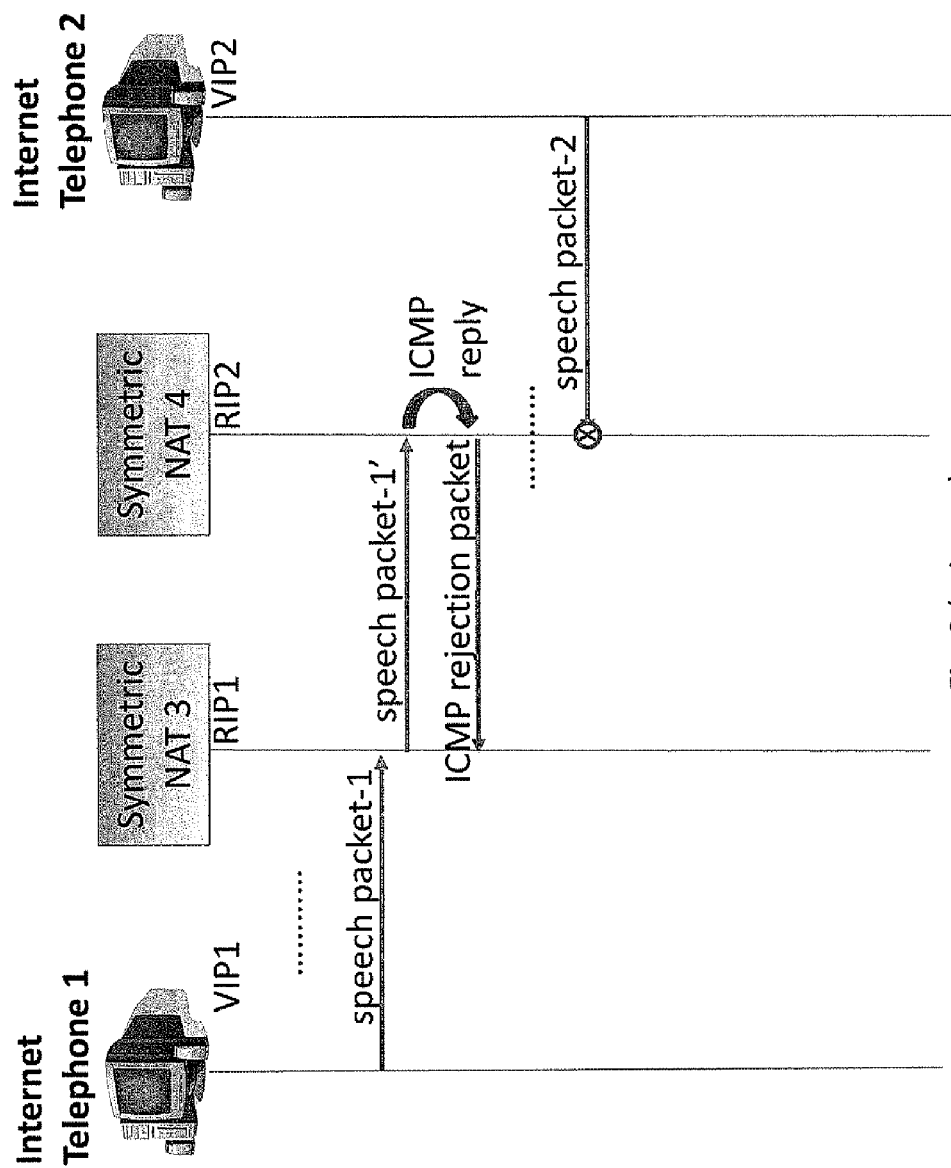
FIG. 3 shows schematically the "inbound".
Figure 4:
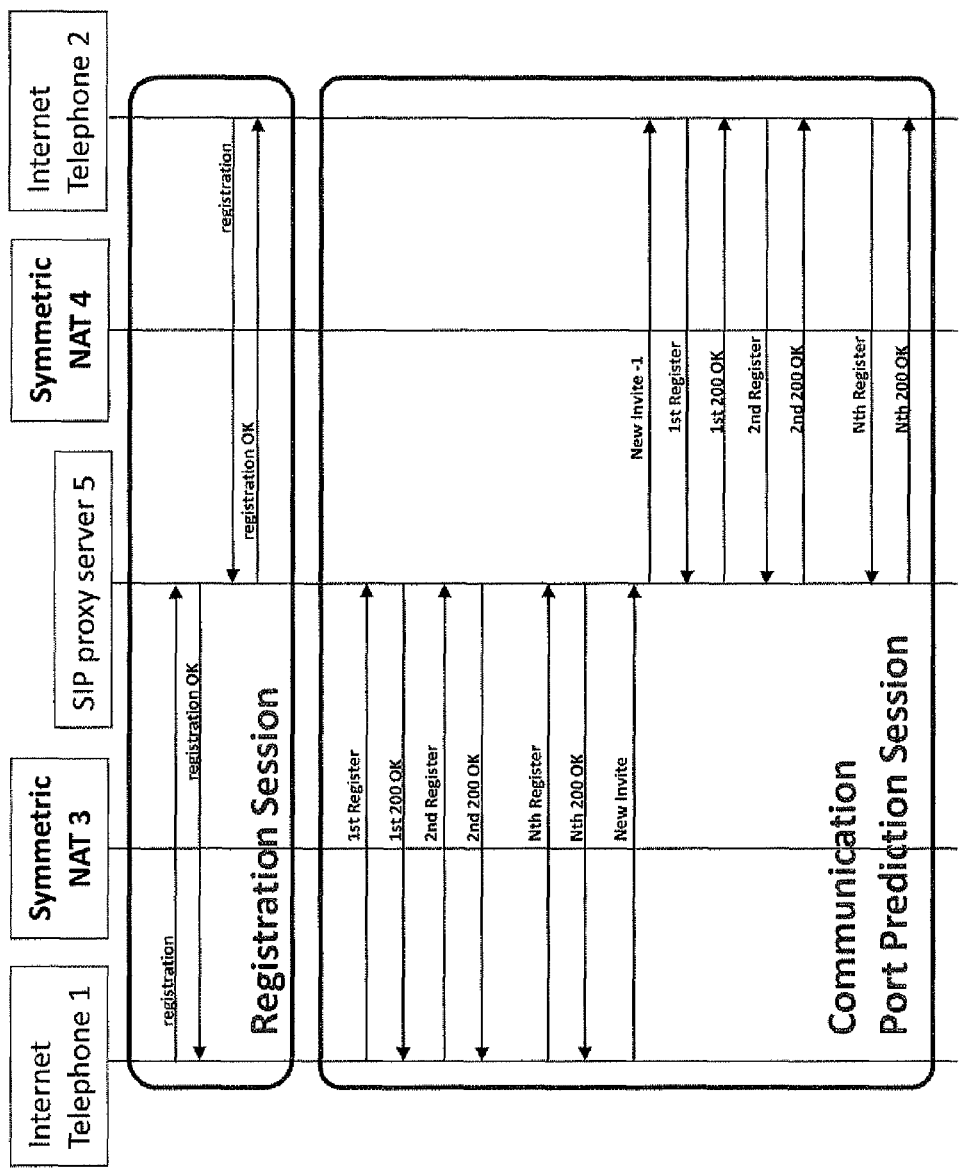
FIG. 4 shows schematically the registration session and the communication port prediction session.
Figure 5:
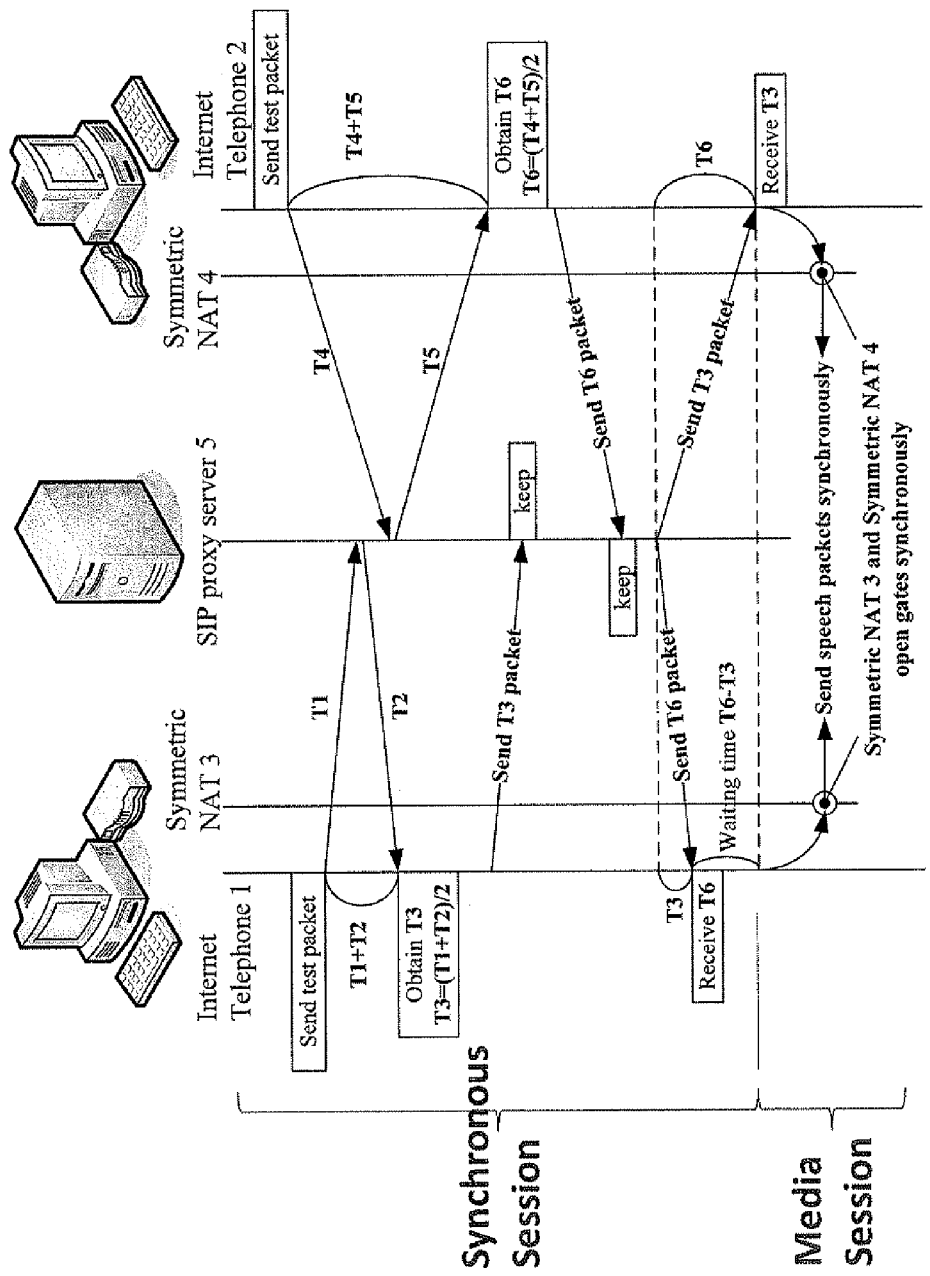
FIG. 5 shows schematically the synchronous session and the media session.

The registration session and the communication port prediction session are shown in FIG. 4, while the synchronous session and the media session are shown in FIG. 5.

Referring to FIG. 4, an Internet telephone 1 and an Internet telephone 2 register on an SIP proxy server 5 firstly to accomplish the registration session.

Thereafter the communication port prediction session is entered. Internet telephone 1 uses "Register" request to conduct a plurality of detection for detecting the regular rule of allocating communication port by the symmetric NAT 3.

After the plurality of detection, the Internet telephone 1 can predict the port number allocated by the NAT3 for being used as the speech packets transmission channel.

Next, the Internet telephone 1 sends "New Invite" request to the SIP proxy server 5 through the symmetric NAT 3, the SIP proxy server 5 will then send "New Invite-1" request to the Internet telephone 2 through the symmetric NAT 4.

After the Internet telephone 2 receives the "New Invite-1" request, the Internet telephone 2 uses "Register" request to conduct a plurality of detection for detecting the regular rule of allocating communication port by the symmetric NAT 4. After the plurality of detection, the Internet telephone 2 can predict the port number allocated by the NAT4 for being used as the speech packets transmission channel. The communication port prediction session is therefore accomplished. There are many other methods for communication port prediction. The method described above is an example from Taiwan Invention Patent I 376133 (related US application is U.S. Ser. No. 12/382,261).

Referring to FIG. 5, in which the synchronous session and the media session are described. The Internet telephone 1 passes a test packet to the SIP proxy server 5 through T1 time, then the SIP proxy server 5 returns the test packet to the Internet telephone 1 through T2 time. (T1+T2)/2 is therefore the average time T3 that the Internet telephone 1 sends a packet to the SIP proxy server 5. Then the Internet telephone 1 sends a packet including T3 information to the SIP proxy server 5 for being kept by the SIP proxy server 5.

Similarly, the Internet telephone 2 passes a test packet to the SIP proxy server 5 through T4 time, then the SIP proxy server 5 returns the test packet to the Internet telephone 2 through T5 time. (T4+T5)/2 is therefore the average time T6 that the Internet telephone 2 sends a packet to the SIP proxy server 5. Then the Internet telephone 2 sends a packet including T6 information to the SIP proxy server 5 for being kept by the SIP proxy server 5.

After the SIP proxy server 5 receives the packets including time information from both sides, the SIP proxy server 5 will then exchange the time information to the opposite side simultaneously. The Internet telephone 1 will receive the packet including T6 information sent from the Internet telephone 2; the Internet telephone 2 will receive the packet including T3 information sent from the Internet telephone 1.

If T6>T3, then after the Internet telephone 2 receives the packet including T3 information, the Internet telephone 2 enters the media session immediately to send speech packets directly to the Internet telephone 1 without going through the SIP proxy server 5; while the Internet telephone 1 has to wait T6–T3 time after receiving the packet including T6 information, and then enter the media session to send speech packets directly to the Internet telephone 2 without going through the SIP proxy server 5. Therefore both sides have entered the media session to send speech packets with each other synchronously; If T3>T6, then after the Internet telephone 1 receives the packet including T6 information, the Internet telephone 1 enters the media session immediately to send speech packets directly to the Internet telephone 2 without going through the SIP proxy server 5; while the Internet telephone 2 has to wait T3–T6 time after receiving the packet including T3 information, and then enter the media session to send speech packets directly to the Internet telephone 1 without going through the SIP proxy server 5. Therefore both sides have entered the media session to send speech packets with each other synchronously.

The scope of the present invention depends upon the following claims, and is not limited by the above embodiments.

What is claimed is:

1. A traversal method for ICMP-sensitive NAT, a registration session, a communication port prediction session, a synchronous session and a media session are set up for SIP, and an Internet environment for SIP comprises a first Internet telephone, a second Internet telephone, a first symmetric NAT, a second symmetric NAT, and an SIP proxy server; the first Internet telephone is under the first symmetric NAT, the second Internet telephone is under the second symmetric NAT; both the first symmetric NAT and the second symmetric NAT are ICMP-sensitive; the traversal method comprises:

a. the first Internet telephone and the second Internet telephone register on the SIP proxy server firstly to accomplish the registration session;

b. the first Internet telephone conducts a plurality of detection procedure to the first symmetric NAT for detecting the regular rule of allocating communication port by the first symmetric NAT; the second Internet telephone conducts a plurality of detection procedure to the second symmetric NAT for detecting the regular rule of allocating communication port by the second symmetric NAT; so as to accomplish the communication port prediction session;

c. thereafter the synchronous session is entered, the first Internet telephone passes a test packet to the SIP proxy server through T1 time, then the SIP proxy server returns the test packet to the first Internet telephone through T2 time; (T1+T2)/2 is therefore the average time T3 that the first Internet telephone sends a packet to the SIP proxy server; then the first Internet telephone sends a packet including T3 information to the SIP proxy server for being kept by the SIP proxy server;

d. similarly, the second Internet telephone passes a test packet to the SIP proxy server through T4 time, then the SIP proxy server returns the test packet to the second Internet telephone through T5 time; (T4+T5)/2 is therefore the average time T6 that the second Internet telephone sends a packet to the SIP proxy server; then the second Internet telephone sends a packet including T6 information to the SIP proxy server for being kept by the SIP proxy server;

e. after the SIP proxy server receives the packets including time information from both sides, the SIP proxy server will then exchange the time information to the opposite side simultaneously, the first Internet telephone will receive the packet including T6 information sent from the second Internet telephone; the second Internet telephone will receive the packet including T3 information sent from the first Internet telephone;

f. if T6>T3, then after the second Internet telephone receives the packet including T3 information, the second Internet telephone enters the media session immediately to send speech packets directly to the first Internet telephone without going through the SIP proxy server; while the first Internet telephone has to wait T6−T3 time after receiving the packet including T6 information, and then enter the media session to send speech packets directly to the second Internet telephone without going through the SIP proxy server; therefore both sides have entered the media session to send speech packets with each other synchronously;

g. if T3>T6, then after the first Internet telephone receives the packet including T6 information, the first Internet telephone enters the media session immediately to send speech packets directly to the second Internet telephone without going through the SIP proxy server; while the second Internet telephone has to wait T3−T6 time after receiving the packet including T3 information, and then enter the media session to send speech packets directly to the first Internet telephone without going through the SIP proxy server; therefore both sides have entered the media session to send speech packets with each other synchronously.

\* \* \* \* \*